(12) United States Patent
Ambrose

(10) Patent No.: US 6,543,307 B2
(45) Date of Patent: Apr. 8, 2003

(54) ROBOTIC SYSTEM

(75) Inventor: Robert O. Ambrose, Houston, TX (US)

(73) Assignee: Metrica, Inc., Princeton, NJ (US)

( * ) Notice: Subject to any disclaimer, the term of this patent is extended or adjusted under 35 U.S.C. 154(b) by 0 days.

(21) Appl. No.: 09/827,449

(22) Filed: Apr. 6, 2001

(65) Prior Publication Data

US 2002/0144565 A1 Oct. 10, 2002

(51) Int. Cl.[7] .................................................. B25J 19/06
(52) U.S. Cl. ............................. 74/490.03; 74/490.01; 901/49
(58) Field of Search .................... 74/490.01, 490.03; 901/27, 49, 50

(56) References Cited

U.S. PATENT DOCUMENTS

| | | | |
|---|---|---|---|
| 4,169,336 A | | 10/1979 | Kuhn |
| 4,481,001 A | | 11/1984 | Graham et al. |
| 4,555,953 A | | 12/1985 | Dario et al. |
| 4,555,954 A | | 12/1985 | Kim |
| 4,668,861 A | | 5/1987 | White |
| 4,683,669 A | | 8/1987 | Greer, Jr. |
| 4,694,231 A | | 9/1987 | Alvite' |
| 4,777,868 A | * | 10/1988 | Larsson ........................ 92/42 |
| 4,802,815 A | * | 2/1989 | Funabashi et al. .......... 414/680 |
| 4,886,361 A | | 12/1989 | Furstenau |
| 4,904,514 A | * | 2/1990 | Morrison et al. ........... 414/728 |
| 4,932,919 A | | 6/1990 | Shapero |
| 4,944,755 A | * | 7/1990 | Hennequin et al. ...... 623/18.11 |
| 4,999,849 A | * | 3/1991 | Grilliot et al. .................. 2/123 |
| 5,015,421 A | | 5/1991 | Charkoudian |
| 5,038,488 A | * | 8/1991 | Abramowky et al. ......... 33/501 |
| 5,155,423 A | | 10/1992 | Karlen et al. |
| 5,182,557 A | | 1/1993 | Lang |
| 5,513,992 A | | 5/1996 | Refait |
| 5,568,957 A | | 10/1996 | Haugs |
| 5,761,965 A | * | 6/1998 | Dahlquist ................. 74/490.01 |
| 5,901,756 A | * | 5/1999 | Goodrich ..................... 138/110 |
| 6,039,068 A | * | 3/2000 | Tessier et al. ............... 137/377 |
| 6,082,290 A | * | 7/2000 | Conlin ........................ 118/326 |
| 6,267,022 B1 | * | 7/2001 | Suzuki ..................... 74/490.01 |
| 6,279,412 B1 | * | 8/2001 | Beaulieu et al. ......... 74/490.01 |

FOREIGN PATENT DOCUMENTS

JP            363065973    * 12/2000

OTHER PUBLICATIONS

Japanese Patent Translation of JP9,254,076A.

* cited by examiner

Primary Examiner—David A. Bucci
Assistant Examiner—Julie K. Smith
(74) Attorney, Agent, or Firm—Watts Hoffmann Fisher & Heinke

(57) ABSTRACT

A robot having a plurality of interconnected sections is disclosed. Each of the sections includes components which are moveable relative to components of an adjacent section. A plurality of electric motors are operably connected to at least two of said relatively moveable components to effect relative movement. A fitted, removable protective covering surrounds the sections to protect the robot.

8 Claims, 2 Drawing Sheets

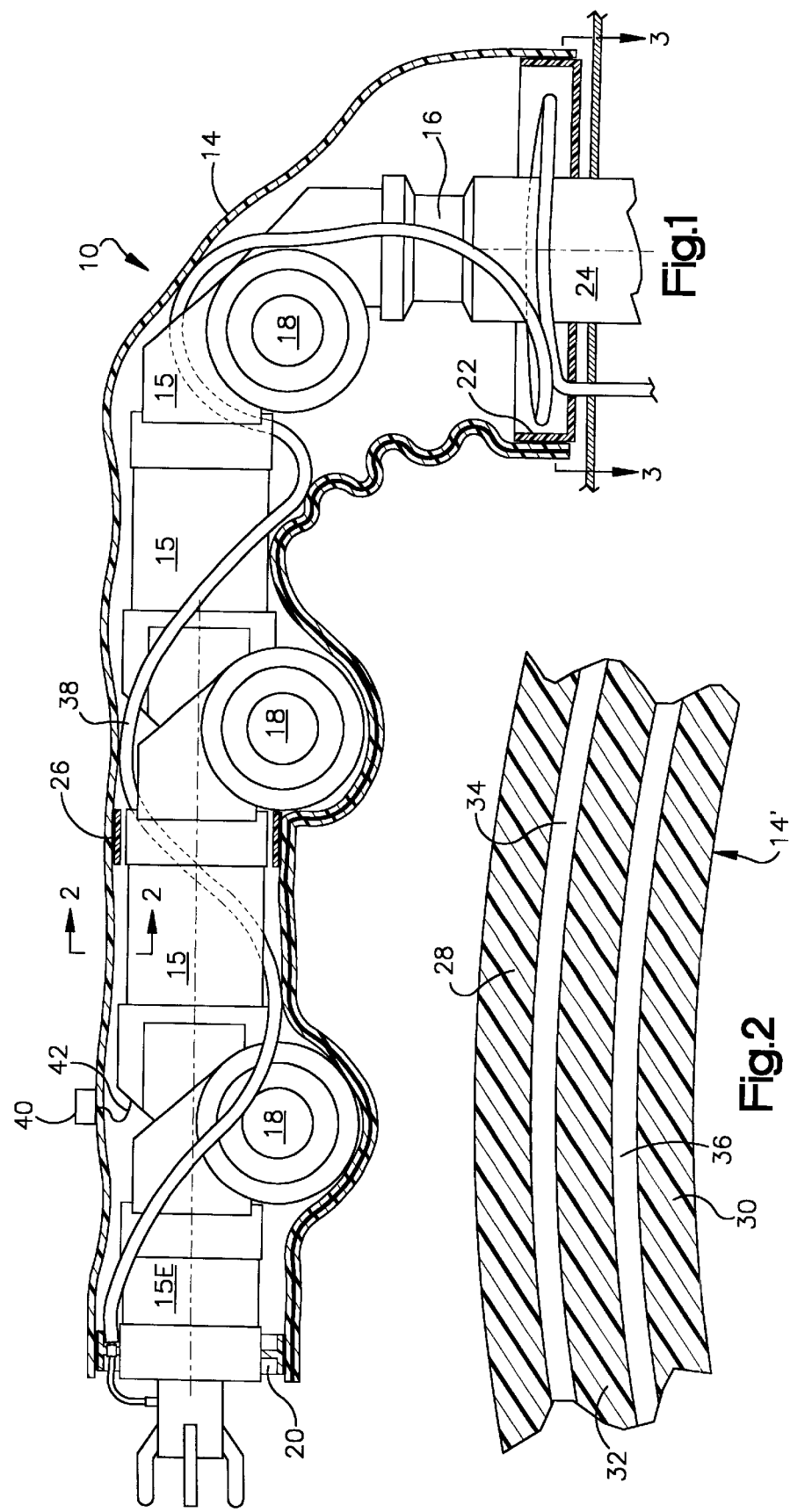

ROBOTIC SYSTEM

This invention was made with government support under contract NAS9-97016 awarded by NASA. The government has certain rights in this invention.

TECHNICAL FIELD

This invention relates to robots and more particularly to a robotic system which is especially suited for use in applications in outer space.

BACKGROUND OF THE INVENTION

Mechanical robots for effecting manipulative functions are now relatively widely used. While they have been widely used, prior robots for many applications have significant shortcomings.

One problem that has been recognized, is that a robot may require protection while working in certain environments. While there have been proposals to provide protective coverings in such environments, such proposals have been in the nature of afterthoughts providing loose coverings which are by no means optimized solutions to the problem.

Other problems that exist include making appropriate provisions for external cable routing and mounting of sensors external to the robot. Prior systems with external cables or sensors, have been susceptible to damage through engagement with other devices or personnel. Moreover, such external cables and/or sensors have, too often, failed to provide full operational flexibility which might otherwise be achieved.

Moreover, cables more typically are internally routed through tight passages and bends with small radii among other things making cable servicing or upgrades difficult. Moreover, access to such cables for maintenance is limited and difficult.

There are applications where it is desirable to provide visual servoing techniques for, for example, remote control operation of a robot. The ability to use such visual servoing techniques has in the past been limited because shinny box-like structures are difficult to detect and precisely locate due to their inherent reflectivity.

Contaminants can be a problem in space and other applications. Prior proposals to protect robots against contaminants from their ambient environments have enjoyed limited success. Moreover, protection of a robot's environment from contamination by the robot has largely been ignored.

Prior robots, particularly large ones, can be dangerous for humans working nearby. Further, they are susceptible to damage being caused by impacts between such robots and nearby structures. Heretofore, little has been done to deal with these dangers other than those persons operating or near to robots exhibiting great care.

With prior robots, little has been done to protect a robot thermally from harsh cold and hot environments. As a consequence, applications in thermally harsh environments have been limited.

Accordingly, it would be desirable to provide a robotic system which overcomes the described and other shortcomings of prior robot systems.

SUMMARY OF THE INVENTION

A robotic system constructed in accordance with the present invention has a plurality of interconnected and relatively moveable sections. Electric, preferably DC, motors are operably interposed between the sections to effect relative motions. Bearinged outer rings are mounted externally at ends of the robot and preferably also at joints between adjacent sections.

A protective outer, preferably fabric, flexible covering is provided. The covering is constructed to closely fit around and cover the robot. Hook and loop fasteners are provided to affix the covering to the bearinged outer rings to surround the robot as a close protective covering, fitted to permit full manipulation of the robot without interference with that manipulation.

The robot with its covering has a number of unique features. Cables are readily routed externally of the robot and maintained in appropriate positions by the removable covering. Since the covering is readily removable, servicing of existing cabling or addition of further cabling is readily and rapidly achievable. Moreover, the system enables the cables to have bends of relatively large radii to enhance cable life as the robot is cycled through its articulating functions.

Sensors are selectively mounted on the removable covering or skin. This enables such things as detection of a potential collision with a sensor supported by the skin. Such early detection facilitates avoidance of an actual collision of the robot itself with an adjacent object and hence protection of the robot and the object from damage.

The provision of a system designed to have interchangeable flexible coverings enables selective change of the external appearance of the robotic system. Thus, if a robot is to be remotely controlled through visual observation, a covering having an appearance optimized for that visual observation is readily available. Moreover, since the covering is, as contrasted with the prior art, tailored for a close and repeatable fit, remote visual control can be more accurate than would be possible, had it occurred with prior proposals for coverings, since those prior coverings were loosely retrofitted.

Where contamination of the robot by the ambient atmosphere or vice versa is to be protected against, a novel three layer skin or covering is provided. The three layers define two chambers. An outer chamber between an outer and central layer is positively pressurized for rejecting environmental contamination. The outer chamber may also be used for heating or cooling in thermally harsh environments. The inner chamber between the inner layer and the central layer is evacuated to discharge any contaminants coming either from the ambient atmosphere or from the robot itself.

When a chamber in the covering is used for thermal protection, the protection can be achieved by circulating air through the chamber. Further, the covering may be radiation reflective to protect against solar energy either directly from the sun or as reflected back by the earth to a robot being operated in space.

The preferred covering of the robotic system is a soft fabric equipped with padding to protect persons working near the robot from injury. The padding also limits damage to the robot and a nearby object in the event of a collision between the robot and the object.

Accordingly, the objects of the invention are to provide a novel and improved robotic system and a method of using such a system.

BRIEF DESCRIPTION OF DRAWINGS

FIG. 1 is an elevation view of a robot with the novel and improved covering of this invention shown in cross-section;

FIG. 2 is a sectional view of a modified covering having two internal chambers;

BEST MODE FOR CARRYING OUT THE INVENTION

Figure 3:
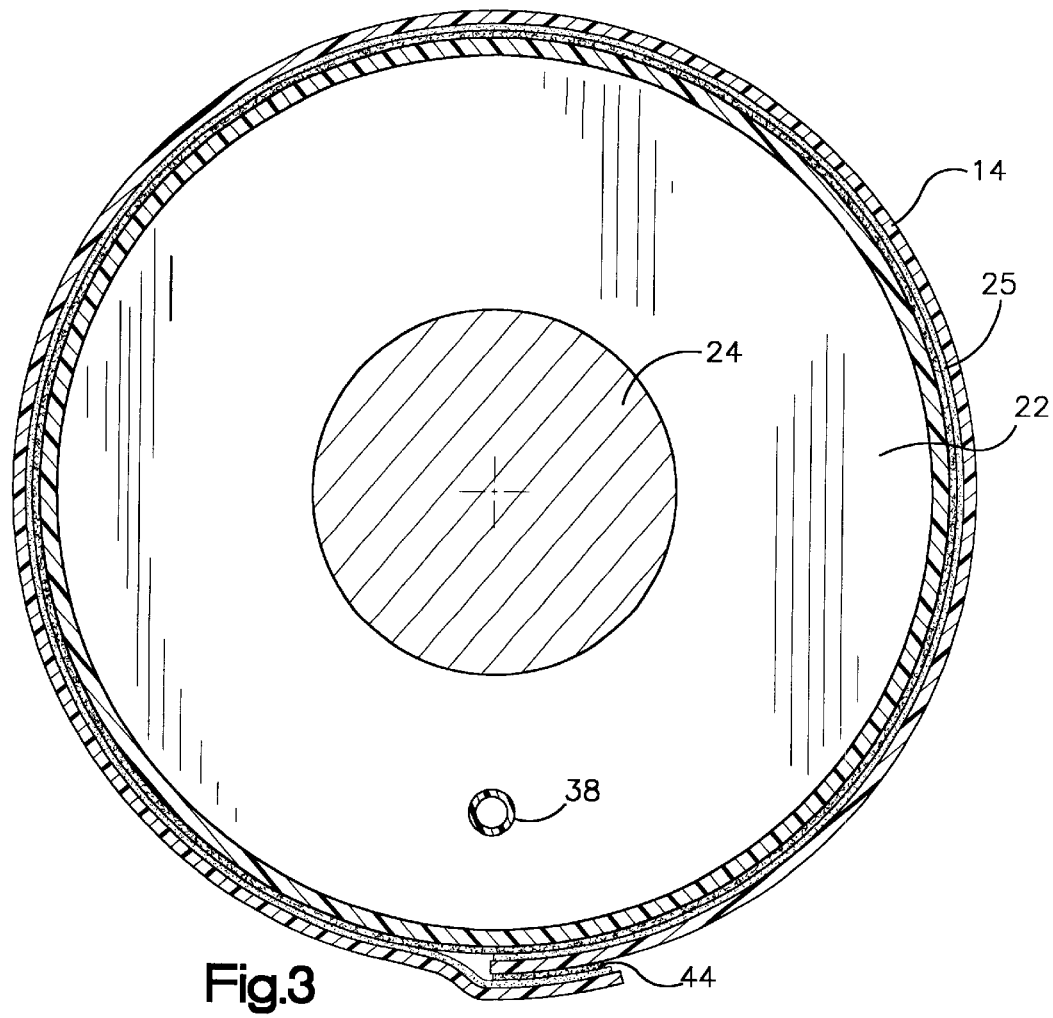
FIG. 3 is a sectional view of the device as seen from the plane indicated by the lines 3—3 of FIG. 1; and, FIG. 4 is an enlarged fragmentary perspective view of an end section of the covering.

Referring to the drawings and FIG. 1 in particular, the robotic system of the present invention is shown generally at 10. The system includes a robot shown generally at 12 and a covering 14. The robot 12 includes a plurality of relatively moveable sections 15 forming an arm. The arm is cantilever mounted on a base 16. A plurality of DC motors 18 are provided.

Each of the motors 18 is interposed between a pair of adjacent sections to effect relative movement between the sections. In the embodiment of FIG. 1 that movement is articulation about the axes of he motors 18.

An end ring 20 is journaled on an end section 15E. As the section 15E rotates, the end ring 20 will remain stationary. Similarly, a base ring 22 is journaled on a base section 24. The covering 14 is connected to the end and base rings 20, 22 by hook and loop fasteners shown best at 25 in FIG. 4. Thus, if the end section 15E is rotated, or the robot 12 is rotated about the axis of the base section 24, the cover 14 maintains a fixed position relative to the robot 12 due to the bearings journaling the end and base rings 20, 22.

Preferably, the cover 14 is also connected to an intermediate section ring 26. The intermediate section rings 26 are also journaled on the robot 12, so that manipulative motions can be achieved while the rings and covering remain in fixed relative positions and the covering is maintained in its close association with the robot 12.

In FIG. 2, a cross-section of an alternate covering embodiment is shown. The FIG. 3 embodiment has outer layers 28, 30 and a central layer 32. The outer and central layer 28, 32 define a first chamber 34, while the outer and central layers 30, 32 define a second chamber 36. Hot or cool air may be circulated through one of the chambers, respectively, to protect the robot 12 from cold or hot environments. The other of the chambers may be evacuated. Thus, contaminants collected in the other chamber can be withdrawn from the covering by a suitably attached vacuum source. Further, where contamination is a problem, air may be circulated through the outer chamber to collect and evacuate contaminants.

One of the outstanding features of the covering 14 is that it enables cabling to be mounted externally of the robot and held in place by the cover. This advantage is illustrated by the showing of a conductor 38 in FIG. 1. Similarly, the covering 14 carries sensors. One such sensor is illustrated schematically at 40 in FIG. 1 with a lead 42 running from it.

Figure 4:
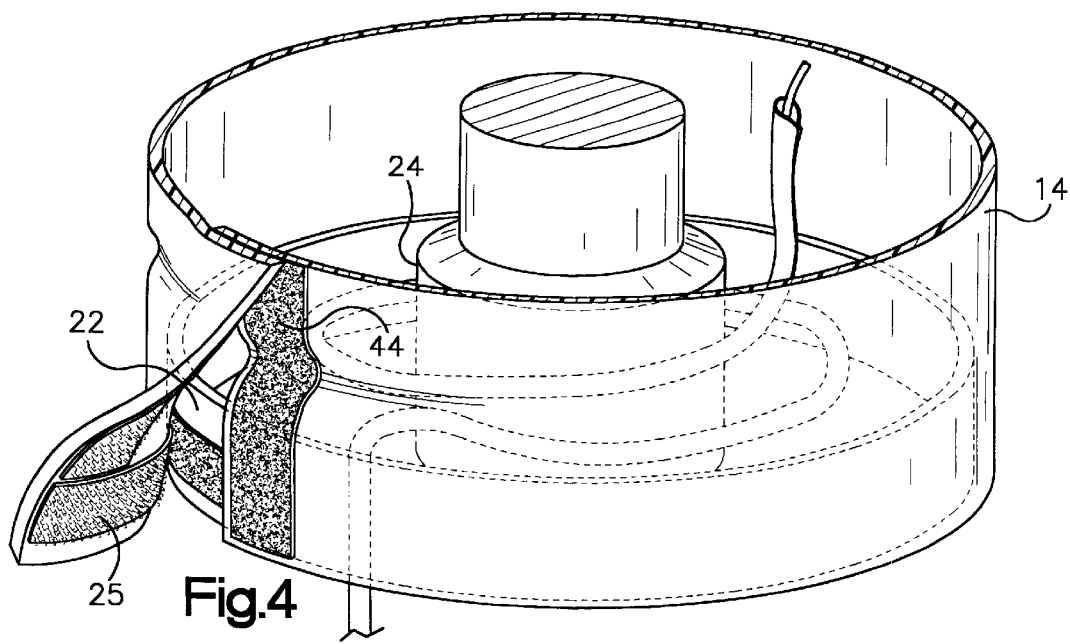

As is best understood by reference to FIGS. 3 and 4, the covering 14 is a wrap around covering which is secured to the end rings 20, 22 by hook and loop fasteners 25. Similarly, longitudinally extending hook and loop fasteners 44 are effective to secure the cover 14 to itself from end to end. Once the fasteners 25 and 44 are secured, the cover is a tubular covering encircling both the base 16 and the cantilever arm sections 15 while extending from the arm end ring 20 to the base ring 22.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

What is claimed is:

1. A robot comprising:
   a) a body including a plurality of relatively moveable sections;
   b) prime movers each operably connected to at least two of the sections for selectively effecting relative movement of the connected sections;
   c) a plurality of rings carried by the body;
   d) two of the rings being positioned in spaced relationship respectively near opposite ends of the body;
   e) a flexible covering surrounding at least a portion of the body and connected to the two rings respectively near the opposite ends of the body; and,
   f) the covering being fitted to the body intermediate the ends and the covering includes an internal chamber.

2. The robot of claim 1 wherein the covering includes a pair of internal chambers.

3. The robot of claim 2 wherein one of they chambers is inflatable and the other is evacuatable.

4. The robot of claim 1 wherein the covering chamber is evacuatable.

5. The robot of claim 1 wherein the covering chamber is inflatable.

6. A process of covering a robot having a plurality of relatively moveable sections comprising:
   a) substantially surrounding outer surfaces of the robot by covering the robot with a flexible cover tailored to fit the robot;
   b) securing the cover to the robot at least near spaced ends of the robot whereby the robot is substantially covered by the cover; and,
   c) inflating a chamber formed in the cover.

7. The process of claim 6 further including evacuating another chamber formed in the cover.

8. A process of covering a robot having a plurality of relatively moveable sections comprising:
   a) substantially surrounding outer surfaces of the robot by covering the robot with a flexible cover tailored to fit the robot;
   b) securing the cover to the robot at least near spaced ends of the robot whereby the robot is substantially covered by the cover; and,
   c) evacuating a chamber formed in the cover.

* * * * *